Charles H. Eggleston's Imp'd Disk
PRUNING SHEARS.

No. 117525 — Patented Aug 1 1871

Witnesses.
John C. Fitzgerald
John C. Sutton

Inventor.
Charles H. Eggleston

UNITED STATES PATENT OFFICE.

CHARLES H. EGGLESTON, OF MARSHALL, MICHIGAN.

IMPROVEMENT IN PRUNING-SHEARS.

Specification forming part of Letters Patent No. 117,525, dated August 1, 1871.

*To all whom it may concern:*

Be it known that I, CHARLES H. EGGLESTON, of the city of Marshall, county of Calhoun and State of Michigan, have invented certain Improvements in Disk Pruning-Shears, of which the following is a specification:

My invention relates to the combination of a pair of pivoted steel disks, provided with tangs to enter handles, to constitute a pair of pruning-shears, the blades of which are formed by cutting out of the body of each disk a suitable-shaped section, so as to form a recess or indentation to receive the limb to be cut; the object being to resist the springing of the cutting-blades, and also prevent excessive wear of the pivot-heads, produced by the oblique action of the one-sided ground bevel of the cutting-blades in passing through the wood; also to adapt the shears for use with either side next the tree.

Figure 1:
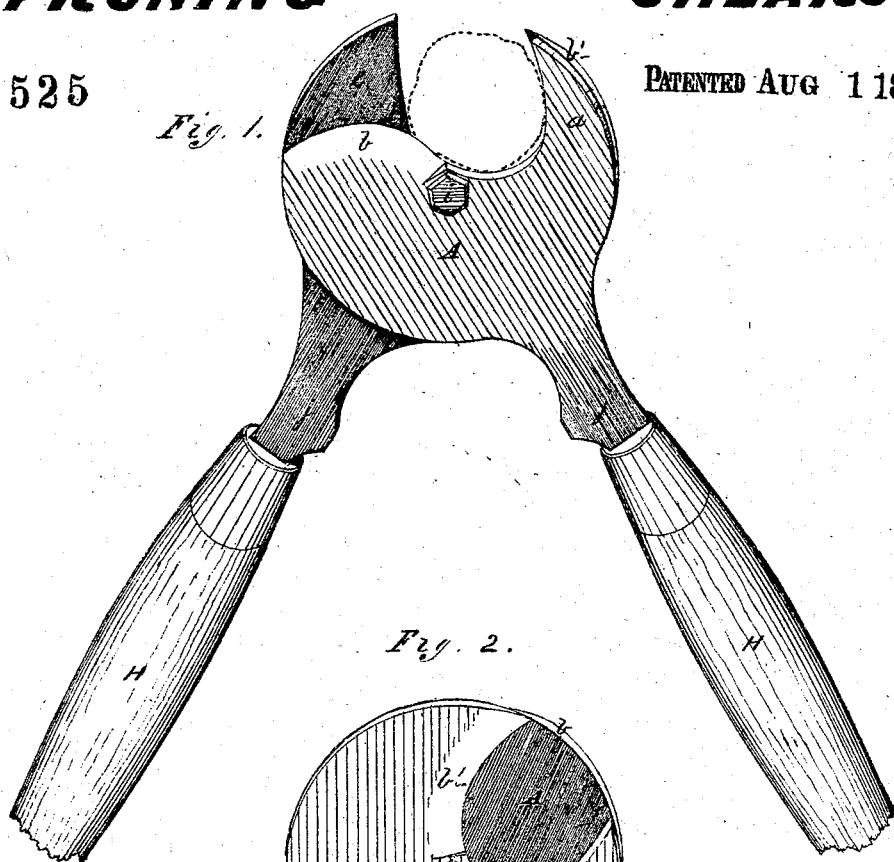
Figure 2:
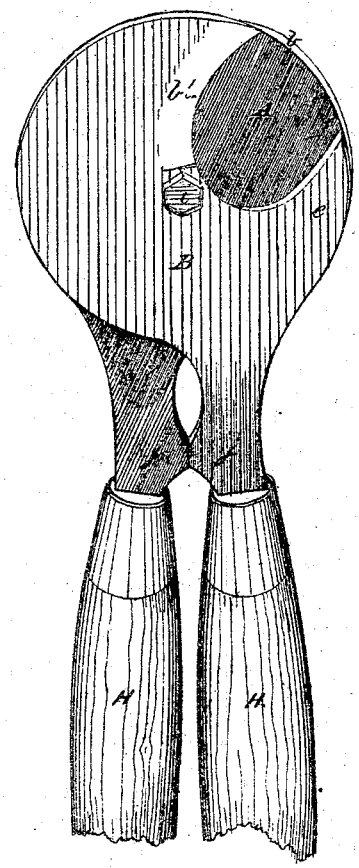

Figure 1 represents one side of the shears fully opened. Fig. 2 represents the reverse side of the shears closed.

A and B are the two steel-plate disks, pivoted together at $i$, each disk being furnished with a tang, $j$, to attach it (by insertion) to the ferruled handle H, shown as broken off. A section of the disk A, extending from near the pivot-center $i$ to the periphery, is cut away, substantially as shown in Fig. 1, the convex edge at $b$ being chamfered on the outer side and ground to a cutting-edge, so as to constitute the main cutting-blade, and the remaining or concave portion of the edge formed by such cutting away is usually finished square. The disk B has also a portion cut away, as seen in Fig. 2; the edge at $b'$ being ground to a cutting-edge, and this edge is usually the same form in reverse as the edge of the main cutter $b$, as the two edges are designed to overlap at the termination of the cut. The distance across the opening in the disk B is just sufficient to admit the largest-sized limb that the shears are adjudged capable of pruning.

It will be seen by a reference to the drawing that that portion $e$ of the disk B serves as a guard or backing to steady and guide the path of the main cutting-blade $b$ while it is making its cut with a drawing action; said blade cutting the largest portion of the limb, and the portion $a$ of the disk A exercises a similar function for the concave cutter $b'$ of the disk B, according to the relative penetration of said blade.

I do not desire to confine myself to the exact shape of the edges formed by the cut-away sections, as shown, for such may be varied to give more or less drawing action, and that without interfering with the application of the principle involved, viz., to leave a portion of each disk to support, steady, and guide the opposite cutting sections; nor is it important that the remaining edges of the disks should be unbroken concentric circular arcs, for they may be cut away in parts to make them lighter; but, for that purpose, I prefer to leave them intact, as shown, and make them proportionally thinner.

The blades of the disks are opened by the extension of the handles, and are caused to inclose the limb to be cut, as shown by the dotted lines. The handles H are now forcibly closed together and the limb is cut off by the opposing cutting action of the closing blades, in the manner following: The blade $b$ makes a drawing cut of about two-thirds the distance across the limb, while the blade $b'$ has cut in the remaining one-third, holding the limb steady all the time close to the fulcrum, against the superior cutting action of the blade $b$.

It will be readily seen that the two blades cannot spring together and collide at the end of the cut, for the section $e$ compels the blade $b$ to move along its surface plane, and the section $a$ compels the cutter $b'$ to move in a similar but opposite path, so that the limb is cut off clean and square without bruising the bark of the stub, no matter which side of the shears is presented to it.

The distribution of the material in my pruning-shears enables the limb to be got close to the fulcrum-point, and, as there can be no springing or twisting of the blades, they may safely be brought to a much thinner and finer edge than is warranted in the ordinary hook and blade shears; and the great wear on the heads of the pivot, occasioned by this torsional strain on unsupported cutting-blades, is entirely obviated.

I claim as my invention—

The pruning-shears, composed of the two pivoted disks A and B, indented, recessed, or cut away to form the cutting-blades $b$ $b'$, and resisting guide-sections $a$ and $e$, substantially as and for the purpose set forth.

CHARLES H. EGGLESTON.

Witnesses:
JOHN C. FITZGERALD,
JOHN C. STETSON.